United States Patent [19]

Iguchi

[11] 4,455,550

[45] Jun. 19, 1984

[54] DETECTION CIRCUIT FOR A VIDEO INTRUSION MONITORING APPARATUS

[75] Inventor: Shozo Iguchi, Tokyo, Japan

[73] Assignee: General Research of Electronics, Inc., Tokyo, Japan

[21] Appl. No.: 425,500

[22] Filed: Sep. 28, 1982

Related U.S. Application Data

[63] Continuation of Ser. No. 204,597, Nov. 6, 1980, abandoned.

[51] Int. Cl.[3] .......................... G08B 25/00; H04N 7/18

[52] U.S. Cl. .................................... 340/525; 340/511; 340/526; 358/108

[58] Field of Search ............... 340/525, 526, 531, 537, 340/539, 506, 511, 510, 529; 358/108

[56] References Cited

U.S. PATENT DOCUMENTS

| | | | |
|---|---|---|---|
| 3,580,998 | 5/1971 | Hammond | 358/108 |
| 4,148,062 | 4/1979 | Kamin | 358/108 |
| 4,257,063 | 3/1981 | Loughry et al. | 358/108 |

*Primary Examiner*—Donnie L. Crosland

*Attorney, Agent, or Firm*—Trexler, Bushnell & Wolters, Ltd.

[57] ABSTRACT

An intrusion monitoring apparatus wherein horizontal and vertical sync signals separated from the video signal generated by a monitor television camera are used to produce window pulses having respective timings and lengths corresponding to discrete spots on the video frame screen, said window pulses being used for gating the input video signal, sudden level change of the respective gated video signal portions being detected to provide an audible and/or visual alarm.

4 Claims, 3 Drawing Figures

DETECTION CIRCUIT FOR A VIDEO INTRUSION MONITORING APPARATUS

This application is a continuation of application Ser. No. 204,597, filed Nov. 6, 1980, now abandoned.

BACKGROUND AND OBJECT OF THE INVENTION

This invention relates to an intrusion monitoring apparatus, more particularly to the apparatus for automatically providing an audible and/or visual alarm in response to the detection of an intrusion into an area which is being monitored.

Hitherto, the detection of an intrusion into the area which is being monitored included the fact that a person monitors at all time the monitoring screen using a television camera and a remote monitor unit. In order to avoid the person judging the intrusion, a kind of an automatic apparatus was developed. Such apparatus was the one wherein photoelectric elements are installed at various points on the surface of the monitoring television screen so that the change of the brightness of the television screen surface is detected as the change of the outut from the photoelectric cells to provide an alarm signal. Because the photoelectric cells were set up on the monitoring screen, a portion of the screen was masked. Further, it was necessary that the monitor screen always be left on.

Therefore the object of the invention is to avoid the disadvantages of the prior art apparatus.

Other objects and advantages of the invention will be clear from the description given below with respect to the drawings.

DETAILED DESCRIPTION OF THE INVENTION

Figure 1:
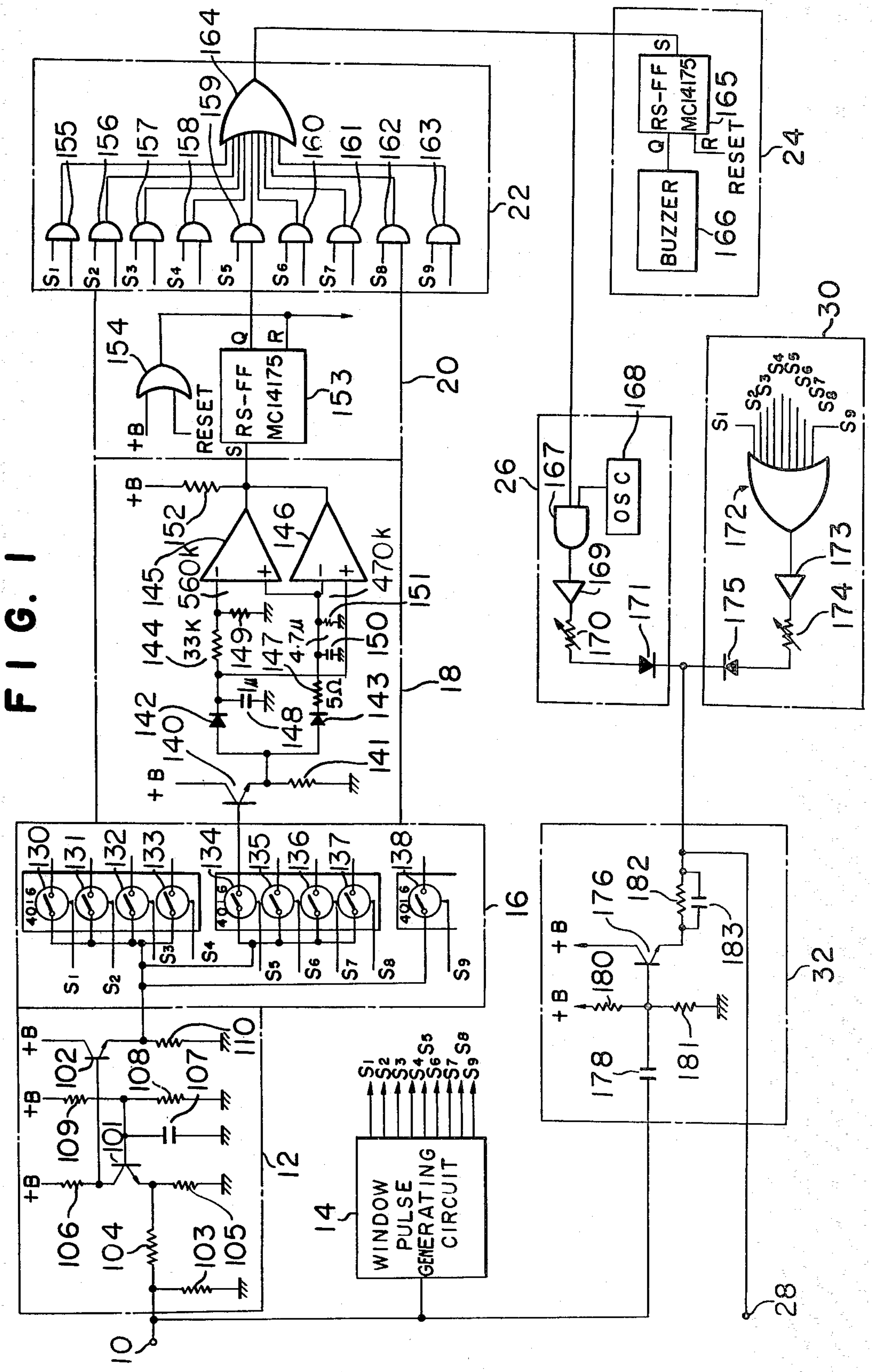
FIG. 1 shows a circuit diagram of one embodiment of the invention.

With reference to FIG. 1, the apparatus embodying this invention receives at terminal 10 a video signal from a conventional television camera located at a remote monitoring area. The video signal at the input terminal 10 is amplified by a video amplifier generally indicated by reference numeral 12. This amplifier may be any one of conventional amplifiers which can amplify the input video upto the level of several volts peak to peak between the white peak and the sync-tip. The circuit 12 as shown in FIG. 1 comprises two direct-coupled transistors 101 and 102. 120 Ω resistor 103 is connected between the input terminal 10 and the ground. 200 Ω resistor 104 is connected between the input terminal 10 and the base of the first transistor 101 which is grounded through 100 Ω resistor 105. The base of the transistor 101 is connected to resistor 109 to +B voltage reference and also grounded through a parallel circuit comprising capacitor 107 and resistor 108. The collector of the transistor 101 is connected to the +B voltage through resistor 106 and also to the base of the second transistor 102 which acts as an emitter follower. The collector of the transistor 102 is connected to the +B power supply and the emitter thereof is grounded through emitter resistance 110.

The video signal at the terminal 10 is also supplied to window pulse generating circuit 14. The circuit 14 generates window pulses by using a horizontal (H) synchronization signal and vertical (V) synchronization signal of the input video. In the illustrated embodiment, there are provided nine window pulses $S_1$, $S_2$, $S_3$, $S_4$, $S_5$, $S_6$, $S_7$, $S_8$ and $S_9$. These pulses have respective timings and lengths corresponding to spots discretely positioned on the video picture of the television camera.

Figure 2:
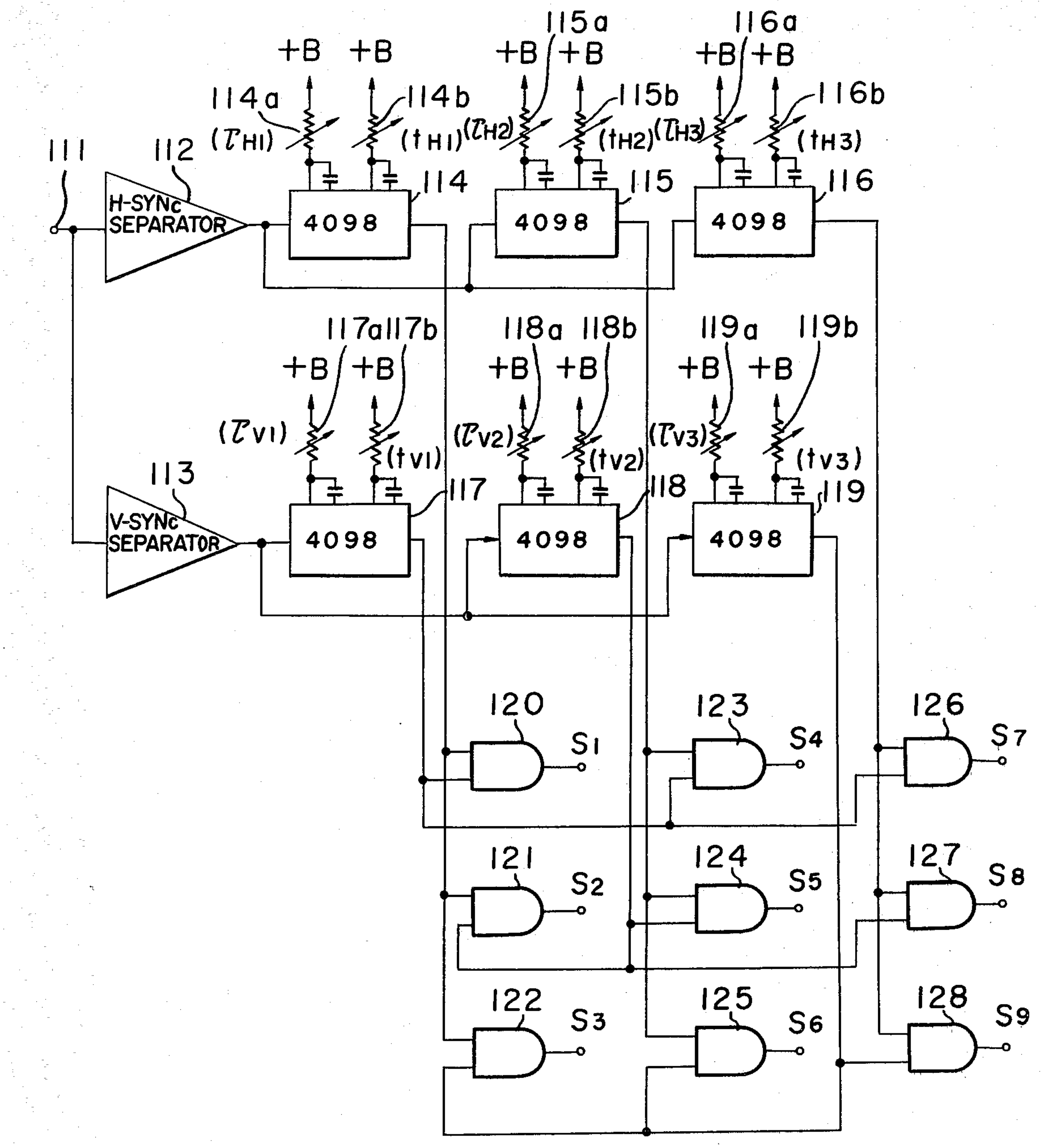
FIG. 2 shows a detailed circuit diagram of the window pulse generating circuit as shown in block in FIG. 1.

The number of the window pulses is not important in this invention. A more detailed circuit of the window pulse generating circuit is shown in FIG. 2.

Input terminal 111 receives the input video signal which is supplied to both of H sync separator 112 and V sinc separator 113. These sync separators 112 and 113 are well known in the art. The separated H sync signal is supplied to three delay circuits 114, 115 and 116 which are 4098 type IC's. This commercial IC includes two delay multivibrators. An external potentiometer and capacitor determine the delaying time constant of the multivibrator. In relation to the output of the V sync separator 113, there are provided with the three same types of delay circuits 117, 118 and 119.

The output of the first H delay circuit 114 and the output of the first V delay circuit 117 are connected to the respective inputs of a first AND gate 120. The output $S_1$ of the first AND gate 120 determines the first spot 120' on the video image screen shown in FIG. 3. That is, the signal $S_1$ has a timing and length corresponding to the video signal portion of the spot 120'. The horizontal timing ($\tau_{H1}$) and horizontal length ($t_{H1}$) of the spot 120' are determined by time constant potentiometers **114*a* and 114*b* of the first H delay circuit 114, respectively. The vertical timing ($\tau_{v1}$) and vertical length ($t_{v1}$) of the spot 120' are determined by time constant potentiometers 117*a* and 117*b* of the first V delay circuit 117, respectively. AND gate 121 receives the output of the first V delay circuit 114 and the second V delay circuit 118 and provides window pulse $S_2$ corresponding to spot 121' which has the horizontal timing $\tau_{H1}$ and the length $t_{H1}$ and the vertical timing $\tau_{v2}$ and length $t_{v2}$ determined by the potentiometers 118*a* and 118*b* of the second V delay circuit 118. AND gate 122 receives the output of the first H delay circuit 114 and the output of the third delay circuit 119 and provides window pulse $S_3$ corresponding to spot 122' which has the horizontal timing $\tau_{v1}$ and length $t_{H1}$ and the vertical timing $\tau_{v3}$ and length $t_{v3}$ determined by the potentiometers 119*a* and 119*b* of the third V delay circuit 119, respectively. AND gate 123 receives the output of the second H delay circuit 115 and the output of the first V delay circuit 117 and provides window pulse $S_4$ corresponding to spot 123' which has the horizontal timing $\tau_{H2}$ and length $t_{H2}$ determined by the potentiometers 115*a* and 115*b* of the second H delay circuit 115, respectively, and the vertical timing $\tau_{v1}$ and length $t_{v1}$. AND gate 124 receives the output of the second H delay circuit 115 and the output of the second V delay circuit 118 and generates window pulse $S_5$ corresponding spot 124' which has the horizontal timing $\tau_{H2}$ and length $t_{H2}$ and the vertical timing $\tau_{v2}$ and length $t_{v2}$. AND gate 125 receives the output of the second H delay circuit 115 and the output of the third V delay circuit 119 and generates window pulse $S_6$ corresponding to spot 125' which has the horizontal timing $\tau_{H2}$ and length $t_{H2}$ and the vertical timing $\tau_{v3}$ and length $t_{v3}$. AND gate 126** receives the output of the third H delay circuit 116 and the output of the first V delay circuit 117 and generates window pulse $S_7$ corresponding to screen spot 126' of which vertical timing and length are $\tau_{H3}$ and $t_{H3}$, respectively, as determined by the potentiometers 116a and 116b, respectively, of the third H delay circuit, with the vertical timing $\tau_{v1}$ and length $t_{v1}$, respectively. AND gate 127 receives the output of the third H delay circuit 116 and the output of the second V delay circuit 118 and generates window pulse $S_8$ corresponding to the spot 127' which has the horizontal timing $\tau_{H3}$ and length $t_{H3}$ and the vertical timing $\tau_{v2}$ and length $t_{v2}$. The last AND gate 128 receive the output of the third H delay circuit 116 and the output of the third V delay circuit 119 and generates window pulse $S_9$ corresponding to spot 128' which has the horizontal timing $\tau_{H3}$ and length $t_{H3}$ and the vertical timing $\tau_{v3}$ and length $t_{v3}$.

Firstly, these window pulses $S_1$ to $S_9$ are used to gate the video signal in an analogue gate circuit 16 in FIG. 1. As previously mentioned, the respective window pulse has the timing and duration relating to the predetermined spot position on the monitor television screen image, that is, a video frame. Therefore, when such window pulse is used as the gating pulse for the video signal, a portion of the video signal is sampled out which has the same timing as that of the window pulse. The analogue gate circuit 16 in FIG. 1 comprises nine analogue switches 130, 131, 132, 133, 134, 135, 136, 137 annd 138. The switching input of each switch receives the respective window pulse. That is, the switch 130 receives the window pulse $S_1$, and the switches 131, 132, 133, 134, 135, 136, 137 and 138 receive the window pulses $S_2$, $S_3$, $S_4$, $S_5$, $S_6$, $S_7$, $S_8$ and $S_9$, respectively. These switches may be constructed by commercial IC's, for example, 4616 type IC's each of which includes four same switches.

The switch outputs are connected to a level detector which can detect sudden level changes of the video portions sampled out by the window pulses. When an intrusion occurs within the monitored area, at least some of the video signal portions corresponding to the spots 120'-128' in FIG. 3 suffer their level changes. There are two kinds of the level changes, large to small (bright to dark, the spot brightness), small to large (dark to bright). The level detector detects such two kinds of the level change. Only one of the nine level detector units constituting the level detector is shown in FIG. 1 connected to the output of the switch 134 of the analogue gate 16. It should be noted that the same types of the units as the illustrated unit 18 are provided connected to all other switch outputs.

The level detector unit 18 in FIG. 1 includes a transistor emitter follow circuit having transistor 140 of which base is connected to the output of the switch 134 to receive the video signal portion sampled out by the window pulse $S_5$. The collector of the transistor is connected to the +B power supply and the emitter is coupled to the ground through resistor 141 and also to two diodes 142 and 143. The cathode of the first diode 142 is connected through resistor 144 to the inverting input of a first operational amplifier 145 and also directly to the non-inverting input of a second operational amplifier 146. The cathode of the second diode 143 is connected through resistor 147 to the non-inverting input of the first operational amplifier 145 and the inverting input of the second operational amplifier 146. Capacitor 148 is connected between the cathode of the diode 142 and the ground. Resistor 149 is connected between the inverting input of the first operational amplifier 145 and the ground. A parallel circuit comprising capacitor 150 and resistor 151 is connected to the non-inverting and inverting inputs of the amplifiers 145 and 146, respectively, and the ground. The outputs of the first and second operational amplifiers 145 and 146 are connected together and to the +B voltage level through resistor 152. The values of the resistors 144, 149, 147 and 151 are 33 KΩ, 560 KΩ, 5Ω and 470 KΩ, respectively. The value of the capacitors 148 and 150 are 1 μF and 4.7 μF, respectively. Therefore, it can be easily understood that the charge and discharge time constant $T_1$ given by the elements 148, 144, 149 at the inverting input of the first operational amplifier 145 and the non-inverting input of the second operational amplifier 146 is smaller than the charge and discharge time constant $T_2$ given by the elements 150 and 151 at the non-inverting input of the first operational amplifier 145 and the inverting input of the second operational amplifier 146.

When there are succeeding sampled or extracted video signal portions from the switch 134 which are the same level, that is there is no intrusion, the interconnected outputs of the first and second amplifiers 145 and 146 are biased by the +B voltage and the resistor 152 so that no output from the amplifier is produced although some voltage differences between the inputs of the first amplifier 145 and between the inputs of the second amplifier 146 are created. When the level of the signal portion was abruptly changed to a small level because of the intrusion, the voltage level at the non-inverting input of the first operational amplifier 145 becomes larger than that at the inverting input of the same amplifier. This produces the level detector output. The detection sensitivity may be selected so that with several succeeding level-decreased video portions input to the detector unit the detector output can be produced. The second operational amplifier 146 can detect the other status wherein the level of the signal portion was suddenly changed to a large level, which would be created in accordance with a kind of the intrusions. At that time, the voltage level at the non-inverting input of the second operational amplifier 146 becomes larger with respect to the inverting input of the same amplifier. This also produces a detector unit output.

The detector output is supplied to a memory circuit, of which one unit is shown in FIG. 1 at 20 in connection with the level detector unit 18. The whole system includes nine memory units. The unit 20 has set-reset flip-flop 153 of which set input receives the level detector output from the unit 18. The flip-flop may be constructed with MC 14175 type commercial IC. Once the flip-flop is set, it remains the set state until a reset signal is supplied thereto. The reset signal is provided from the output of OR gate 154. There are two inputs to the OR gates 154, one is the +B which is provided at the time of power on and the other is a signal from a manual reset switch. The unit 20 generates Q output when the flip-flop is set.

The memory output Q is supply to timing gate 22 which comprises nine AND gates 155, 156, 157, 158, 159, 160, 161, 162 and 163 and nine-input OR gates 164. The AND gates 155 to 163 receive the respective window pulses $S_1$ to $S_9$, respectively together with the Q outputs from the related memory units. For example, the AND gate 159 provides an output synchronized with the window pulse $S_5$.

The output of the timing gate 122 is supplied to buzzer circuit 24 comprising set-reset flip-flop 165 of which set input receives the output from the timing gate 22 and buzzer drive circuit 166 receiving the Q output of the flip-flop 165. The flip-flop is reset by the signal from the manual reset switch.

The output of the timing gate 122 is also supplied to flasher circuit 26 for providing flashing on the monitor screen as a visual alarm at the time of the detection of the intrusion. The flasher circuit 26 includes AND gate 167 which receives the output from the timing gate 22 and the output of the oscillator 168. The output of the AND gate 167 is supplied to output terminal 28 through buffer amplifier 169, variable resistor 170 and diode 171.

Figure 3:
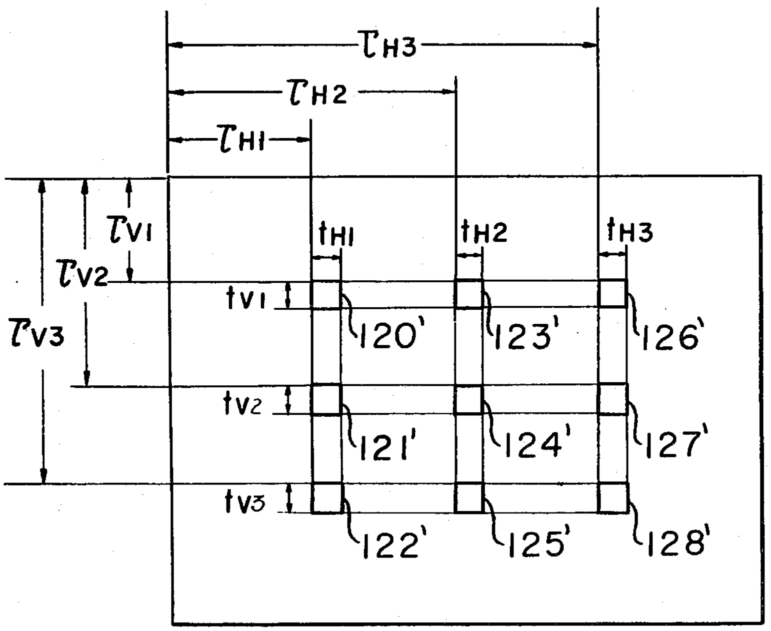
FIG. 3 is the illustration of the monitor screen as used for explanation of the invention.

A means is provided for giving the identification of the spots shown in FIG. 3 on the monitor screen upon over all monitoring time. This means is shown in FIG. 1 comprising OR gate 172 receiving the window pulses $S_1$ to $S_9$. The output of the OR gate 172 is connected to the output terminal 28 through buffer amplifier 173, variable resistor 174 and diode 175.

The output terminal 28 is also connected to the input terminal 10 through buffer amplifier 32. The buffer amplifier 32 insulates the input 10 from the output circuits and includes transistor 176 of which base is connected to input terminal 10 through capacitor 178. Also the base is connected to the +B through resistor 180 and grounded by resistor 181. The collector of the transistor 176 is connected to the +B voltage source and the emitter is connected to the output terminal 28 through a parallel circuit comprising resistor 182 and capacitor 183.

I claim:

1. An intrusion monitoring apparatus receiving a video output comprising a sequence of video frame images from a television camera and generating an alarm in response to the detection of an intrusion, comprising: means for generating at least one window pulse per one video frame, said window pulse having a timing and length determining a specified spot of a video frame image, means for gating and extracting a video signal portion of the video output from said camera by using said at least one window pulse, detection means for providing a detection output signal in response to changes in the level of the gated video signal portion, said detection means including a first amplifier and a second amplifier having respective inverting and non-inverting inputs and a common output circuit, first and second resistor-capacitor time constant circuits responsive to said gated video signal and each feeding the inverting input of one of the first and second amplifiers and the non-inverting input of the other of said first and second amplifiers, the first resistor-capacitor time constant circuit having a time constant different from that of the second resistor-capacitor time constant circuit, whereby the common output circuit provides said detection output signal only in response to a change in the level of said gated video signal which occurs within a time interval of on the order of the difference in the time constants of said first and second resistor-capacitor time constant circuits, and means for providing the alarm in response to said detection output signal.

2. An intrusion monitoring apparatus as claimed in claim 1 further comprising, means connected to receive said detection output for synchronizing the same with occurrence of said window pulse.

3. An intrusion monitoring apparatus as claimed in claim 1 wherein said alarm providing means is a flasher device for providing flashing on the monitor screen.

4. An intrusion monitoring apparatus as claimed in claim 1 wherein said window pulse generating means comprises a horizontal synch separator and a vertical synch separator, which are connected to receive the video signal from said camera, and delay and gate means connected to said separators for providing said window pulses by using the separated horizontal and vertical synchs.

* * * * *